Patented Oct. 11, 1949

2,484,526

UNITED STATES PATENT OFFICE 2,484,526

CALCIFEROL CHAULMOOGRATE AND PROCESS

Henry Penau and Guy Hagemann, Paris, France, assignors to Usines Chimiques des Laboratoires Francais, et par abréviation U. C. L. A. F., Paris, France, a French company No Drawing. Application December 6, 1946, Serial No. 714,637. In France May 23, 1946

2 Claims. (Cl. 260—397.2)

Some calciferol esters (including anisic, dinitro-3,5 benzoic, β-naphtoic esters and the like, see J. Sivadjian, "La Chimie des Vitamines et des Hormones," Gauthier-Villars, Paris, 1938, 55) have already been prepared by a process comprising treating calciferol (vitamine $D_2$) by acid chlorides in the presence of pyridine.

Esters obtained by said process, and those obtained by other processes (e. g. allophanic ester) described in the literature have not been employed in therapeutic.

One object of the invention is to prepare some therapeutically valuable calciferol esters, by treating crystallized pure vitamine $D_2$ by acid chlorides in the presence of pyridine and an organic solvent, such as benzene, said solvent being adapted to dissolve the different reagents and to avoid secondary separations during the reaction. More specifically, the invention has for its object to provide a process by which new crystallized or chemically pure esters of low molecular aliphatic and aromatic acids such as calciferol acetate, propionate, benzoate, etc., and new chemically pure esters of higher fatty acid such as calciferol oleate, chaulmoograte, can be readily prepared.

For certain new therapeutic purposes, these new esters are preferably used in lieu of pure crystallized vitamin $D_2$, which was heretofore used in the free state, and brought into oily or alcoholic solution.

Isolation and purification of the esters obtained in accordance with the present process, is preferably carried out by eliminating, by suitable washings, the excess of organic acid chlorides and pyridine, whereupon the solution in the solvent in use is dehydrated and dry distilled in vacuum. The ester thus obtained is then submitted to one or several crystallizations.

The invention is not limited to the esters described in the following examples, since further calciferol esters suitable for other therapeutic purposes, can be prepared in the pure state by treating calciferol with further organic acid chlorides.

Example 1.—Crystallized calciferol benzoate 10 gr. of crystallized vitamine $D_2$ are dissolved in 40 cc. of benzene and 20 cc. of pyridine. To said solution are then added 10 cc. of benzoyl chloride, dissolved in 30 cc. of benzene at 0° C. The reacting mixture is first stirred up during 10 minutes at 0° C. under cooling, then during 40 minutes while allowing the temperature to rise to 20° C. When the reaction is completed, the excess of chloride is washed off with 250 cc. of a saturated solution of sodium bicarbonate and the excess of pyridine is washed off with acids. The final benzenic solution is then dehydrated and dry distilled in vacuum. The crude benzoate obtained dry is allowed to crystallize in a mixture of 25 cc. of acetone and 20 cc. of methanol, at 0° C. By recrystallization in said acetone-methanol mixture, calciferol benzoate is isolated in a pure state.

Calciferol benzoate is collected in the form of white crystals, readily soluble in acetone, benzene, toluene. It is but slightly soluble in methanol, but it directly dissolves in vegetable oils, without intermediate solvent; a 6% solution of said ester in olive oil is quite stable.

Calciferol benzoate exhibits the following features: M. P. 92° C.—Rotatory power: $(\alpha)_{5790}=+100°$ (concentration 1% in acetone).

The absorption curves of said ester and free vitamine $D_2$ in ultraviolet are not identical: the branch of the curve for the wave lengths below 2550 Å., in the case of calciferol benzoate is above the corresponding branch for vitamine $D_2$; the maximum of the curve corresponds to 2550 Å., instead of 265 Å. for the free vitamine $D_2$.

Example 2.—Crystallized calciferol acetate 10 gr. of crystallized vitamine $D_2$ are dissolved in 40 cc. of benzene and 20 cc. of pyridine; to the solution are added 10 cc. of acetyl chloride dissolved in 30 cc. of benzene, at 0° C. The reacting mixture is stirred up first during 10 minutes under cooling at 0° C., then during an hour while allowing the temperature to rise to 20° C. When the reaction is completed, the excess of acetyl chloride and pyridine are eliminated as above described in the case of calciferol benzoate. Crystallization is then carried out, first in an acetone-methanol mixture, then in pure acetone.

Pure calciferol acetate, in the form of white prismatic crystals, is readily soluble in acetone, poorly soluble in methanol. It is readily dissolved in vegetable oils; a 4% solution in olive oil is quite stable.

The acetate is characterized as follows: M. P.: 88° C.

Rotatory power: $(\alpha)_{5790}=+38°$ (concentration =1% in acetone).

The absorption curves of said ester and free vitamine $D_2$ in ultraviolet light are not identical; maximum is 2620 Å. for the ester instead of 2650 Å. for the free vitamine.

Example 3.—Crystallized calciferol propionate 10 gr. of crystallized vitamine $D_2$ are dissolved in 40 cc. of benzene and 20 cc. of pyridine; to the solution are added 10 cc. of propionyl chloride dissolved in 30 cc. of benzene at 0° C. The reacting mixture is stirred up first during 10 minutes under cooling at 0° C., then during 1 hour the temperature rising to 20° C. After treating as above described in the case of calciferol benzoate, propionate is allowed to crystallize in pure acetone, in two successive steps.

Crystallized calciferol propionate is very soluble in acetone, and readily soluble in vegetable oils; a 4% solution in olive oil is quite stable.

The propionate is characterized as follows: M. P.: 77° C.

Rotatory power: $(\alpha)_{5790} = +37°6$ (concentration 1% in acetone).

The absorption curves of said ester and free vitamine $D_2$ in ultraviolet light are almost identical, but the absorption coefficient corresponding to the maximum is fairly lower for the ester.

$$E_{1cm.}^{1\%} = 420 \, (\lambda = 2630 \text{Å.})$$

*Example 4.—Calciferol oleate*

10 gr. of crystallized vitamine $D_2$ are dissolved in 60 cc. of benzene and 20 cc. of pyridine; to the solution are added 15 gr. of rectified oleyl chloride dissolved in 15 cc. of benzene. After stirring the final mixture during 10 minutes at 0° C. and 1 hour from 0° C. to 20° C. under a nitrogen atmosphere, same treatment as described in the case of benzoate is applied.

Calciferol oleate is a liquid at room temperature. It crystallizes at —20° C. in an acetonic solution.

Rotatory power: $(\alpha)_{5790} = 18°7$ (concentration = 1% in chloroform).

The absorption curves of said ester and vitamine $D_2$ in ultraviolet light are almost identical; the descending branch toward short wave length is fairly higher for the ester.

$$E_{1cm.}^{1\%} (2650 \text{Å.}) = 420$$

*Example 5.—Crystallized calciferol chaulmoograte*

10 gr. of crystallized vitamine $D_2$ are dissolved in 60 cc. of benzene and 20 cc. of pyridine. To the solution are added 13 gr. of pure chaulmoogryl chloride dissolved in 13 cc. of benzene. The temperature is maintained at 0° C. during 2½ hours under a nitrogen atmosphere. When the reaction is completed, the excess of reagent is washed off, as in the case of calciferol benzoate.

Calciferol chaulmoograte is allowed to crystallize twice in acetone.

It is very soluble in acetone, readily soluble in vegetable oils, and characterized as follows: M. P.=53° C.

Rotatory power $(\alpha)_{5790} = 52°8$ (concentration = 1% in chloroform).

The absorption curves of said ester and vitamine $D_2$ in ultraviolet light are substantially identical, the descending branch of the curve toward the short wave lengths being slightly higher for the ester.

The contents in vitamine $D_2$ is 57%.

Having now described our invention what we claim as new and desire to secure by Letters Patent is:

1. As a new industrial product, crystallized calciferol chaulmoograte.

2. A process of preparing pure crystallized calciferol chaulmoograte, which comprises converting pure vitamine $D_2$ into the ester by means of pure chaulmoogric acid chloride in the presence of pyridine and benzene.

HENRY PENAU.
GUY HAGEMANN.

REFERENCES CITED

The following references are of record in the file of this patent:

UNITED STATES PATENTS

| Number | Name | Date |
|---|---|---|
| 1,944,542 | Bockmuhl | Jan. 23, 1934 |
| 2,353,684 | Miescher et al. | July 18, 1944 |

OTHER REFERENCES

Windaus et al.: Annalen der Chem., vol. 483 (1930), pp. 26–27.

Askew et al.: Proc. Royal Soc. (London), vol. B109 (1932), pp. 488–505.

Windaus et al.: Annalen der Chem., vol. 521 (1936), p. 168.

Ser. No. 392,734, Weisz (A. P. C.), published April 20, 1943.